(12) United States Patent
Lin

(10) Patent No.: US 12,517,708 B2
(45) Date of Patent: Jan. 6, 2026

(54) METHOD FOR SOFTWARE TRANSLATION, ELECTRONIC DEVICE, AND NON-TRANSITORY COMPUTER-READABLE STORAGE MEDIUM

(71) Applicant: NETEASE (HANGZHOU) NETWORK CO., LTD., Zhejiang (CN)

(72) Inventor: Wanghong Lin, Zhejiang (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 106 days.

(21) Appl. No.: 18/547,514

(22) PCT Filed: Mar. 24, 2022

(86) PCT No.: PCT/CN2022/082870
§ 371 (c)(1),
(2) Date: Aug. 23, 2023

(87) PCT Pub. No.: WO2022/257554
PCT Pub. Date: Dec. 15, 2022

(65) Prior Publication Data
US 2024/0053967 A1 Feb. 15, 2024

(30) Foreign Application Priority Data
Jun. 10, 2021 (CN) .......................... 202110649646.2

(51) Int. Cl.
*G06F 8/40* (2018.01)
*G06F 8/34* (2018.01)

(52) U.S. Cl.
CPC . *G06F 8/40* (2013.01); *G06F 8/34* (2013.01)

(58) Field of Classification Search
CPC ............... G06F 8/40; G06F 8/34; G06F 9/445
(Continued)

(56) References Cited

U.S. PATENT DOCUMENTS 5,678,039 A * 10/1997 Hinks ..................... G06F 9/454
9,256,546 B2 * 2/2016 Gschwind ........... G06F 9/45558
(Continued)

FOREIGN PATENT DOCUMENTS

| CN | 103902251 A | 7/2014 |
| CN | 105138350 A | 12/2015 |

(Continued)

OTHER PUBLICATIONS

Nadin, Mihai. "Interface design: A semiotic paradigm." (1988): pp. 269-302. (Year: 1988).*
(Continued)

*Primary Examiner* — Satish Rampuria
(74) *Attorney, Agent, or Firm* — Qinghong Xu

(57) ABSTRACT

A method for software translation, including: running a target software program and determining a target file in the target software program, where the target file comprises a code logic for a first interface text setting; setting a code logic with a translation function in a code logic for a first interface text setting, and translating original text information in a software interface through the code logic with the translation function to obtain target text information; and displaying a corresponding software interface according to the target text information through a code logic for a second interface text setting.

19 Claims, 8 Drawing Sheets

Obtaining an interface function in the code logic for the first interface text setting — 401

Performing an interception operation on the interface function for the first interface text setting, and directing the interface function for the first interface text setting to a rewritten code logic — 402

After the interception operation on the interface function for the first interface text setting, calling back an interface function for the second interface text setting to display a target software interface text corresponding to the target text information — 403

(58) Field of Classification Search
USPC .................................................. 717/120–178
See application file for complete search history.

(56) References Cited

U.S. PATENT DOCUMENTS

| | | | | |
|---|---|---|---|---|
| 11,301,643 | B2* | 4/2022 | Stuehler | G06F 9/454 |
| 2003/0058267 | A1* | 3/2003 | Warren | G06F 16/34 |
| | | | | 707/E17.093 |
| 2003/0110478 | A1 | 6/2003 | Duesterwald et al. | |
| 2004/0243931 | A1* | 12/2004 | Stevens | G06F 3/0484 |
| | | | | 715/236 |
| 2009/0106017 | A1 | 4/2009 | D Agostini | |
| 2014/0172409 | A1 | 6/2014 | Brunswig et al. | |
| 2014/0298185 | A1* | 10/2014 | Chen | G06F 16/958 |
| | | | | 715/738 |
| 2015/0278105 | A1 | 10/2015 | Gschwind | |
| 2019/0188004 | A1* | 6/2019 | Wisgo | G06F 40/45 |
| 2021/0165855 | A1* | 6/2021 | Stuehler | G06F 16/90344 |

FOREIGN PATENT DOCUMENTS

| | | | |
|---|---|---|---|
| CN | 109284145 | A | 1/2019 |
| CN | 110134397 | A | 8/2019 |
| CN | 110134404 | A | 8/2019 |
| CN | 110909552 | A | 3/2020 |
| CN | 113342437 | A | 9/2021 |
| JP | H0635710 | A | 2/1994 |
| WO | 0029964 | A1 | 5/2000 |
| WO | 0188704 | A | 11/2001 |

OTHER PUBLICATIONS

Paterno', Fabio, Carmen Santoro, and Lucio Davide Spano. "MARIA: A universal, declarative, multiple abstraction-level language for service-oriented applications in ubiquitous environments." ACM Transactions on Computer-Human Interaction (TOCHI) 16.4 (2009): pp. 1-30. (Year: 2009).*
Simonyi, Charles, Magnus Christerson, and Shane Clifford. "Intentional software." Proceedings of the 21st annual ACM SIGPLAN conference on Object-oriented programming systems, languages, and applications. 2006. pp. 451-464. (Year: 2006).*
Hu, Wei, et al. "Secure and practical defense against code-injection attacks using software dynamic translation." Proceedings of the 2nd international conference on Virtual execution environments. 2006. pp.2-12. (Year: 2006).*
Sites, Richard L., et al. "Binary translation." Communications of the ACM 36.2 (1993): pp. 69-81. (Year: 1993).*
International Search Report dated Jun. 7, 2022 of International Application No. PCT/CN2022/082870.
1st Office Action dated Apr. 28, 2022 of Chinese Application No. 202110649646.2.
3rd Office Action dated Jan. 11, 2022 of Chinese Application No. 202110649646.2.

* cited by examiner

Running the target software program, and rewriting the code logic for the first interface text setting in the software program by using the code logic with the translation function ⸺ 201

Running the code logic with the translation function in the code logic for the first interface text setting to translate the interface text, and running the code logic in the code logic for the second interface text setting to display the translated interface text ⸺ 202

FIG.2

METHOD FOR SOFTWARE TRANSLATION, ELECTRONIC DEVICE, AND NON-TRANSITORY COMPUTER-READABLE STORAGE MEDIUM

CROSS REFERENCE

The present disclosure is an US National Stage Application of PCT International Application No. PCT/CN2022/082870, filed on Mar. 24, 2022, which is based upon and claims priority to Chinese Patent Application No. 202110649646.2 entitled "Method and apparatus for software translation", filed on Jun. 10, 2021, and the entire contents of both of which are incorporated herein by reference for all purposes.

TECHNICAL FIELD

The present disclosure relates to the field of computer technology, and in particular, to a method for software translation and an apparatus for software translation, an electronic device, and a non-transitory computer-readable storage medium.

BACKGROUND

Under the background of globalization, the contact between different countries and regions is increasingly close, and the cultural exchange is increasingly frequent, where the Internet is used as a globalized cultural exchange manner, and the international exchange and propagation of computer software are also increasingly increased. However, due to the difference in the languages of various countries and regions, many computer software only provides a single or a few interface use languages, and there are certain language obstacles for people of some countries and regions to use some computer software for internationalization propagation. The existence of such obstacles is not conducive to the promotion and propagation of advanced culture and technology.

It should be noted that the information disclosed in the above background part is only used to enhance the understanding of the background of the present disclosure, and therefore may include information that does not constitute related art known to those of ordinary skill in the art.

SUMMARY

Embodiments of the present disclosure disclose a method for software translation, the method including:
running a target software program and determining a target file in the target software program, where the target file includes a code logic for a first interface text setting;
setting a code logic with a translation function in a code logic for a first interface text setting, and translating original text information in a software interface through the code logic with the translation function to obtain target text information; and
displaying a corresponding software interface according to the target text information through a code logic for a second interface text setting.

Embodiments of the present disclosure further disclose an electronic device, including: a processor, a memory, and a computer program stored on the memory and executable on the processor, where, when the computer program is executed by the processor, the steps of any method for software translations is implemented.

Embodiments of the present disclosure further disclose a non-transitory computer-readable storage medium, where the computer-readable storage medium stores a computer program, and when the computer program is executed by the processor, the steps of any method for software translations is implemented.

It should be understood that the above general description and the following detailed description are merely exemplary and explanatory, and cannot limit the present disclosure.

BRIEF DESCRIPTION OF THE DRAWINGS

In order to more clearly illustrate the technical solutions in the embodiments of the present disclosure, the accompanying drawings that need to be used in the description of the embodiments are briefly described below. Obviously, the accompanying drawings in the following description are merely some embodiments of the present disclosure, and for those skilled in the art, other drawings may be obtained according to these accompanying drawings without creative effort.

FIG. 2 is a step flowchart of another method for software translation according to an embodiment of the present disclosure;

DETAILED DESCRIPTION

Figure 1:
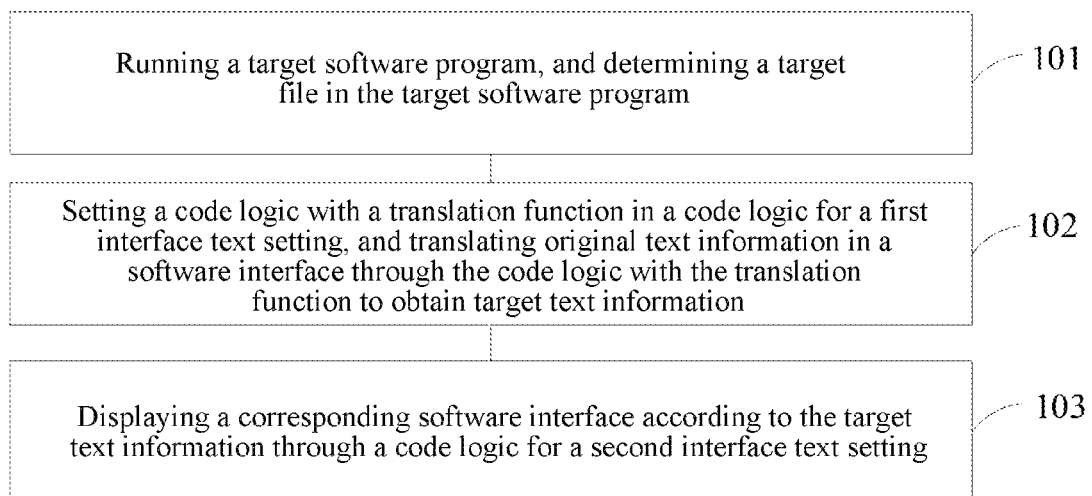
FIG. 1 is a step flowchart of a method for software translation according to an embodiment of the present disclosure.

In order to make the objectives, features and advantages of the present disclosure more comprehensible, the present disclosure is further described in detail below with reference to the accompanying drawings and specific embodiments.

The language used and displayed by the computer software interface may specifically be derived from a separate language resource packet. The language resource packet may include one or more languages. When the software runs, the language resource package can be loaded, and displayed on the software interface by using the corresponding language according to the specific logic rule of the software, so as to provide the user with the use operation guidance of the software.

At present, for internationalization and translation of computer software, the computer software can be enabled to provide user operation use interfaces with different languages for users of different languages. At this time, the language resource packets for providing different languages may be derived from a computer software author, and may also be derived from a software user or a third-party person. That is, internationalized translation of the computer software can be implemented by directly loading a language resource packet and/or by translating and replacing the language resource packet.

Among them, in the first manner, that is, the manner of directly loading a language resource packet is a related method for implementing multiple languages of most computer software. A computer software author may provide a language resource packet with different languages. When the software is released and running, the language resource packet with different languages can be automatically loaded, so that the operation interface of the software can support multi-language selection, achieving internationalized translation of the computer software.

In the second manner, that is in the manner of translating and replacing language resource package, its essence is that an original language resource package is translated and replaced by a software user or a third-party person. When the original language resource package is replaced, the software user or the third-party person needs to obtain a language resource package that is embedded in the software package or downloaded through a network and is released with the software. Format analysis is performed on the obtained language resource package, language entries are extracted, the extracted language entries are translated, and then the translated language entries are written back to the original language resource package, so that the software, when running, can load and use the language resource package after translation and replacement of entries, and display the language entries conforming to the language habit of the user on the software interface.

However, in the first manner, the author of the computer software needs to be proficient in multiple languages, significant investment in resources and manpower is needed, and the production and maintenance cost for the software is high. In the second manner, for the software user or the third-party person, it is needed to analyze and understand the format of the original language resource data packet, the private and non-public or encrypted language resource packet cannot be processed, and the language resource packet downloaded and updated from the network cannot be processed in time, either; the usage scenarios of this manner have limitations, in which it is not only needed to analyze and understand the interfaces or business logic of different software, but may also be needed to process the integrity verification mechanism about the language resource package in the software; the translation and replacement of the language resource package need a significant investment of additional human resources, and subsequent maintenance also needs a significant investment of resources, lacking flexibility and universality.

Based on the fact that in the above two internationalized translation manners for the computer software, there are defects that the cost of investment in manpower is too high, the real-time performance is poor, the processed translation is incomplete, and the universality is poor, one of the core concepts of the embodiments of the present disclosure is not to process the language resource package of the software, but to process the program code of the computer software. Specifically, the API (Application Interface, which can be provided by an operating system or a program framework with software running capability) implementation for the UI (User Interface, which can refer to a user operation and interaction interface of the computer software) component text setting is called through the program, so that the internationalized translation of the computer software can be realized based on the inserted code logic with the translation function when the UI language text is displayed. The use threshold caused by the language obstacle problem is lowered, so that the use of the computer software can efficiently adapt to the language environment and habit of the computer software user, improving the use experience of the computer software user on the software.

Referring to FIG. 1, it shows a step flowchart of a method for software translation according to an embodiment of the present disclosure, which focuses on the use process of the method for software translation, and may specifically include the following steps.

In step 101: a target file in a target software program is determined by running the target software program.

Based on the limitation that software translation is performed by using the language resource package in the related art, the embodiments of the present disclosure do not adopt the manner of processing the language resources of the software program, but process the program code of the software. The processed program code may be derived from the computer software program that needs interface translation.

In the embodiments of the present disclosure, release and running of the computer software usually can be implemented in the form of a binary program. Partial content of the binary program may include a code segment and a data segment. When the computer software is released, the code segment and the initialized/uninitialized data segment may be loaded into the memory, so that when the computer software is running subsequently, the computer or the virtual machine can read the executable content loaded into the code segment in the memory, so as to implement the running of the program.

Among them, the code segment includes binary data that can be understood and executed by the computer, the binary data included in the code segment may be used to determine the functions of the program and the performance of the program. At this time, the code logic used for setting the interface text and included in the target file may be determined, that is, the code logic for the first interface text setting.

In step 102, target text information is obtained by setting a code logic with a translation function in a code logic for a first interface text setting and translating original text information in a software interface through the code logic with the translation function.

In an embodiment of the present disclosure, during the use of the method for software translation, a computer software program that needs interface translation can be run, so as to run the executable content of the code segment in the computer software program that needs to be translated. In order to enable the target software program to have a translation function during running, the code logic in the target software program being run can be processed in advance before running the code logic that needs interface display, so as to implement the translation function based on that the processed code logic can be run when running the software program.

Among them, the translation function of the software program may likewise be implemented by the executable content included in the code segment of the software program, and then processing, in advance, the code logic in target software program being run may be represented as processing the code logic for the first interface text setting used for setting the interface text when running the target software program. Specifically, the code logic with the translation function may be set in the code logic for the first interface text setting.

In practical applications, the software program needs to display the translated interface text on the UI interface, so that processing on the code logic of the software program can be performed in the language display link of the software UI. The language display link of the software UI can be implemented based on the code logic for the first interface text setting used for interface text setting in the running software program. At this time, setting the code logic with the translation function in the code logic for the first interface text setting can refer to rewrite the code logic for the first interface text setting used for interface text setting in the software program using the code logic with the translation function, and locate the code logic with the translation function before the code logic used for interface text setting in the software program, so that when the code logic for the first interface text setting is run for language display, the target text information can be obtained by corresponding text language translation on the original text information of the interface text through the set code logic with the translation function.

In step 103, a corresponding software interface is displayed through a code logic for a second interface text setting according to the target text information.

In an embodiment of the present disclosure, after the code logic for the first interface text setting in the target software program is rewritten by using the code logic with the translation function, the translation interface text of the target software program after code logic rewriting may be run. At this time, the code logic for the second interface text setting before rewriting may be used to display the translated interface text, that is, the target text information, so as to implement translation and display of the software program interface text.

In a specific implementation, the function and the performance of the program running may be achieved by calling an API of an operating system or a virtual machine. In the embodiments of the present disclosure, it may be achieved by calling the API for UI component text setting through the program. That is, at the beginning of the API logic part of the UI component text setting, a segment of code logic with a translation function is inserted, so that the original text information of the target software program can be obtained through the inserted code logic with the translation function in the language display environment of the software UI, the translated language can be obtained through machine translation and partial manual proofreading on the original text information, and then displayed in the software UI. Among them, the machine translation adopted by the code logic can realize the real-time performance of the original language translation of the software UI, and it can ensure the translation accuracy to a certain extent based on the partial manual proofreading link.

In practical applications, the processing opportunity of the code logic with the translation function on the original text information is in the UI language display link, and the original text information obtained by the code logic with the translation function can be character strings in different languages in the text form. At this time, there is no need to additionally understand the format of the language resource package, that is, there is no need to perform additional analysis, modification and replacement operation on the language resource. The original text information (i.e., the character strings) obtained by the code logic with the translation function will be displayed in the software UI, and the obtained character strings may generally be phrases and sentences with practical significance, which may be directly processed through machine translation, with no need to extract and analyze the language included in the character string text. That is, during processing the original text information, the code logic with the translation function does not change the software language resource package, and at this time, there is no need to consider the integrity verification mechanism for the language resource package in the software program.

In the embodiments of the present disclosure, the target software program may be run, the code logic with the translation function is set in the code logic for the first interface text setting of the target software program, the original text information in the software interface is translated through the code logic with the translation function, and then the corresponding software interface is displayed according to the target text information through the code logic for the second interface text setting, achieving translation and display of the software interface text when running the software program. Specifically, the API implementation for the UI component text setting is called through the program, so that the internationalized translation of the computer software can be realized based on the inserted code logic with the translation function when the UI language text is displayed. The use threshold caused by the language obstacle problem is lowered, so that the use of the computer software can efficiently adapt to the language environment and habit of the computer software user, improving the use experience of the computer software user on the software.

Referring to FIG. 2, it shows a step flowchart of another method for software translation according to an embodiment of the present disclosure, which also focuses on the use process of the method for software translation, and may specifically include the following steps.

In step 201, the target software program is run, and the code logic for the first interface text setting in the software program is rewritten by using the code logic with the translation function.

In an embodiment of the present disclosure, during the use of the method for software translation, the method for software translation may be applied to any software implementation based on the method for software translation provided in the embodiments of the present disclosure. At this time, the target software program may be run to run the executable content of the code segment in the computer software program that needs to be translated. In order to enable the target software program to have a translation function during running, the code logic in the target software program being run may be processed in advance before running the target software program that needs interface translation, so as to implement the translation function based on that the processed code logic may be run when running the software program.

Processing, in advance, the code logic in the software program being run may be represented as rewriting the code logic for the first interface text setting used for setting the interface text in the software program by using the code logic with the translation function. Specifically, the code logic with the translation function may be inserted at the beginning of the API logic part of the UI component text setting.

Among them, in order to implement that the code logic with the translation function is inserted at the beginning the API logic part of the UI component text setting, firstly, the code logic position of the code logic for the first interface text setting used for interface text setting in the code segment in the memory can be determined, and based on the determined code logic position in the code segment in the memory, the code logic with the translation function is adopted to rewrite the code logic for the first interface text setting used for interface text setting in the software program.

The manner of determining the code logic position of the code logic for the first interface text setting used for interface text setting in the code segment in the memory, may be that it is determined based on interface function information for the first interface text setting.

Specifically, the interface text setting information of the target software program may be obtained. The interface text setting information may include interface function information for the first interface text setting, then function symbol static scanning analysis may be performed on the target software program according to the interface function information, and the code logic position of the code logic for the first interface text setting used for interface text setting in the code segment in the memory in the software program may be determined.

In practical applications, related documents of different software frameworks about UI text control may be obtained. In the embodiments of the present disclosure, a related document about UI text control in a software program that needs to be translated may be obtained, and interface function information for interface setting included there may refer to related content information about a text setting API in the UI text control.

As an example, related documents about the text setting API in different software frameworks about UI text control may be referred and read. In combination with the function symbol static scanning analysis on the program code segment, a specific position of the UI text setting API in the computer memory may be obtained when the computer software program is run.

In the embodiments of the present disclosure, not only the specific position of the UI text setting API in the computer memory needs to be determined, but also the code logic position that needs to be modified can be determined according to the code logic position of the code logic for the first interface text setting in the code segment in the memory when the software program loads the preset dynamic link library, so as to modify the code logic used for interface text setting at the code logic position that needs to be modified, and replace it as the code logic with the translation function.

In step 202, the code logic with the translation function in the code logic for the first interface text setting is run to translate the interface text, and the code logic for the second interface text setting before rewriting is run to display the translated interface text.

In some embodiments, the code logic at the code logic position that needs to be modified can be backed up, that is, the original binary code logic (i.e., the code logic for the second interface text setting) can be reserved, so that when the backup part of the code logic is executed subsequently, the original binary code logic and the execution result still take effect, ensuring that the UI text setting logic is normal, and enabling the UI text to be displayed normally.

Figure 3:
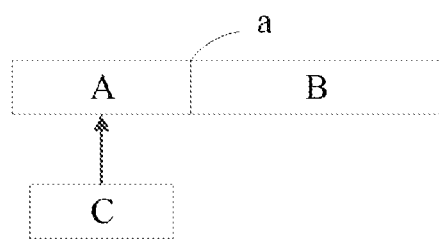
FIG. 3 is a schematic diagram of code logic for rewriting a software program in an embodiment of the present disclosure.

Specifically, referring to FIG. 3, it shows a schematic diagram of rewriting code logic of a software program in an embodiment of the present disclosure. It is assumed that the content blocks A and B are the code logic for the first interface text setting in the target software program, and at this time, the determined code logic position of the code logic used for interface text setting in the code segment in the memory may be located at the point a as shown in the figure. Then, the determined code logic position that needs to be modified may refer to the position of the front part of the first interface code text setting code logic in the code segment in the memory, that is, the position in front of point a. At this time, it can be determined that the content block A in front of point a is the code logic that needs to be replaced. It is assumed that the content block C is the code logic with a translation function, and the content block at the position in front point a can be modified and replaced with the content block C, that is, to replace the content block A with the content block C, and back up the content block A (i.e., the code logic for the second interface text setting).

In an embodiment of the present disclosure, after the code logic used for interface text setting in the software program is rewritten by using the code logic with the translation function, when the software program after the code logic is rewritten is run, the code logic with the translation function in the code logic for the first interface text setting can be run to translate the original text information of the interface text, and the code logic for the first interface text setting can be run to display the translated target text information on the software interface, so that translation and display of the software program interface text are realized.

In the embodiments of the present disclosure, the program code of the computer software is processed, and specifically, the API implementation for the UI component text setting is called through the program, so that the internationalized translation of the computer software can be realized based on the inserted code logic with the translation function when the UI language text is displayed. The use threshold caused by the language obstacle problem is lowered, so that the use of the computer software can efficiently adapt to the language environment and habit of the computer software user, improving the use experience of the computer software user on the software.

Figure 4:
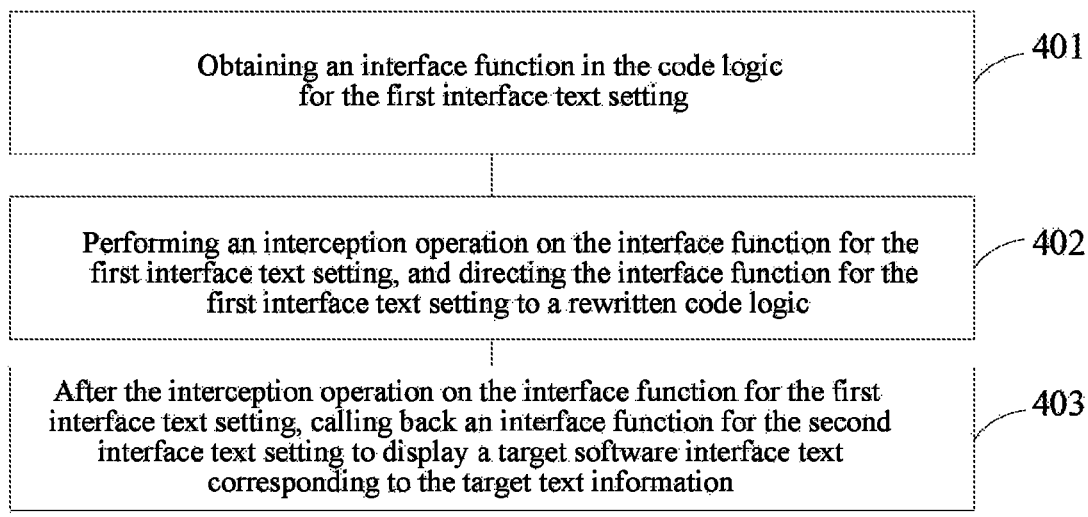
FIG. 4 is a step flowchart of another method for software translation according to an embodiment of the present disclosure.

Referring to FIG. 4, it shows a step flowchart of another method for software translation according to an embodiment of the present disclosure, which focuses on the technical implementation process of the method for software translation, and may specifically include the following steps.

In step 401, an interface function in the code logic for the first interface text setting is obtained.

In an embodiment of the present disclosure, processing the code logic of the computer software program that needs interface translation may be represented as rewriting the code logic for the first interface text setting in the software program by using the code logic with the translation function. In a specific implementation, the function and the performance of program running can be achieved by calling the API of the operating system or the virtual machine. At this time, for the process of rewriting the code logic used for interface text setting, it is actually to process the interface function in the code logic for the first interface text setting.

Specifically, when the computer software program (i.e., the target software program) that needs interface translation is run, firstly, an API function for UI text setting in the software program may be obtained.

In a specific implementation, the position of the API function for UI text setting in the content of the software program needs to be determined. Firstly, related documents about the text setting API in different software frameworks about UI text control may be referred and read. In combination with the function symbol static scanning analysis on the program code segment, a specific position of the UI text setting API in the computer memory may be obtained when the computer software program is run.

In step 402, an interception operation is performed on the interface function for the first interface text setting, and the interface function for the first interface text setting is directed to the rewritten code logic.

In practical applications, after the API function for UI text setting in the software program is obtained, the interception operation may be performed on the obtained interface function. Specifically, it may be implemented through an inline hook technology. After interception, the interface function may be correspondingly processed based on the determined specific position of the interface function used for interface text setting, so as to rewrite the code logic used for interface text setting.

Among them, the rewritten code logic may refer to the code logic for the first interface text setting that the code logic with the translation function is present in front of the code logic used for interface text setting. Then the processing of the interface function may be represented as directing the rewritten interface function to the code logic for the first interface text setting having the code logic with the translation function.

In practical applications, it involves rewriting the code segment in the software program, which can essentially be rewriting the code logic directed by the API. At this time, the API mprotect provided by the operating system can obtain the write permission for the code segment, and rewrite the binary logic used for interface text setting in the code segment.

In a specific implementation, the opportunity to rewrite and replace the API code for UI text setting is when the system loads the dynamic link library. Generally, a dlopen system API or some APIs of virtual machines such as IL2CPP may be used to obtain the code logic position of the binary code that needs to be modified in the memory for modification and replacement, and direct the rewritten API function code segment to the binary logic code in the memory after modification and replacement.

Among them, for the determination of the code logic position of the binary code that needs to be modified in the memory, the position of the UI text setting API in the computer memory can be obtained in combination with the function symbol static scanning analysis on the program code.

In some embodiments, after obtaining the position of the UI text setting API in the computer memory in combination with the function symbol static scanning analysis on the program code, rewriting and replacement may be performed on the UI text setting API code according to the determined position. The implementation of the rewriting and replacement operation on the UI text setting API code may be processed through some implemented tools or frameworks, such as Substrate.

It should be noted that, for different hardware platforms, different operating systems, different software frameworks, and different computer software to be translated, the specific operation processes may vary greatly in implementation, which are not limited in the embodiments of the present disclosure. For different target software to be translated and different tools or frameworks, there may be significant differences in the specific operation manners, which are also not limited in the embodiments of the present disclosure.

In step 403, after the interception operation on the interface function for the first interface text setting, the interface function for the second interface text setting is callback to display the target software interface text corresponding to the target text information.

In an embodiment of the present disclosure, the rewritten interface function may direct to the code logic with a translation function in front of the code logic used for interface text setting and the code logic used for interface text setting. Then, at this time, after the operations of intercepting and rewriting the direction of the interface function used for interface text setting, in order to ensure the function availability of the software program, the original method may be called back to continue for execution through the jump instruction in the hook method. Before callback, execution of the original code logic that has been replaced in the target method needs to be supplemented firstly, thus ensuring the integrity of the original method.

In some embodiments, before rewriting the direction of the function, that is, before rewriting the code logic used for interface text setting, to make sure that the UI text setting logic is normal, and the UI text can be normally displayed, the original binary code logic (i.e., the code logic for the second interface text setting) needs to be reserved, so that when the backup part of the code logic is run subsequently, the original binary code logic and the running result can still take effect, enabling the translated text to be normally displayed on the software interface.

In practical applications, the replaced original code logic, that is, the code logic for the second interface text setting, can be backed up, so that when the software program is run and the interface function for the first interface text is called in the UI language display link, the interface function after the function direction is rewritten can be run, the original text information of the interface can be translated by using the code logic with the translation function to obtain the target text information, then the interface function for the second interface text setting can be called back, and the target software interface text corresponding to the target text information can be displayed.

In the embodiments of the present disclosure, the program code of the computer software is processed, and specifically, the API implementation for the UI component text setting is called through the program, so that the internationalized translation of the computer software can be realized based on the inserted code logic with the translation function when the UI language text is displayed. The use threshold caused by the language obstacle problem is lowered, so that the use of the computer software can efficiently adapt to the language environment and habit of the computer software user, improving the use experience of the computer software user on the software.

In order for those skilled in the art to further understand the method for software translation proposed in the embodiments of the present disclosure, the following will be explained in combination with an application scenario of the method for software translation.

As an example, the embodiments of the present disclosure may be applied to any software implementation based on the method for software translation provided by the embodiments of the present disclosure, such as a computer software program that needs interface translation, which is not limited in the embodiments of the present disclosure.

Figure 5:
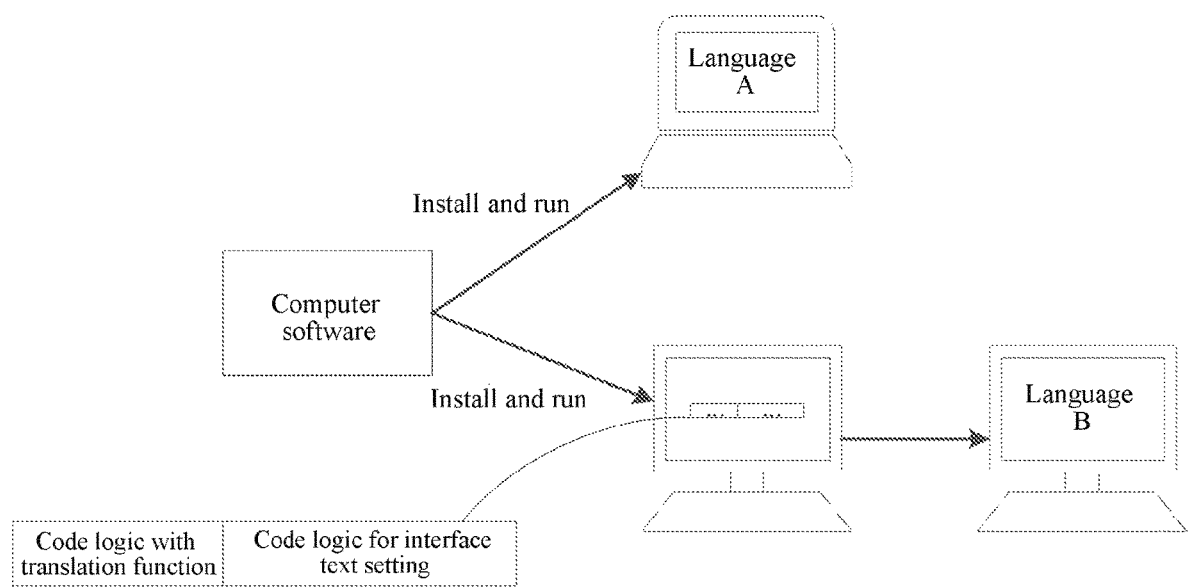
FIG. 5 is a schematic diagram of an application scenario of a method for software translation according to an embodiment of the present disclosure.

Referring to FIG. 5, it shows a schematic diagram of an application scenario of a method for software translation according to some embodiments of the present disclosure. It is assumed that there is a certain computer software and the language text of the software program is language A. A computer software user 1 and a computer software user 2 may respectively install and run the certain computer software. The language environment of the computer software user 1 is language A, and the language environment of the computer software user 2 is language B. When the computer software user 1 installs and runs the computer software, the computer software user 1 can directly install and run the computer software; and at this time, the interface text of the language A is displayed on the computer software interface that is run. When the computer software user 2 installs and runs the computer software, in the process of running the installed computer software, the code logic (i.e., the code logic for the first interface text setting) used for interface text setting needs to be rewritten in the UI language display link, that is, after the interface text of the language A is translated into the language B through the code logic with the translation function in the code logic for the first interface text setting, the translated interface text is displayed on the computer software interface through the code logic for the second interface text setting backed up before rewriting.

As another example, any software implementation applied to the method for software translation may specifically be represented as an accelerator, that is, the software program that is run may be an accelerator. The accelerator may be an installation-free application, and the application may include a plurality of game software. The user may directly double click to use the accelerator, and after the verification succeeds, the user may directly select one of the game software for acceleration. It is assumed that the selected game software for acceleration is the game software that needs interface translation, and since the game software is accelerated through the accelerator, at this time, the interface text of the selected game software for acceleration may be translated through the accelerator that is run.

Figure 6:
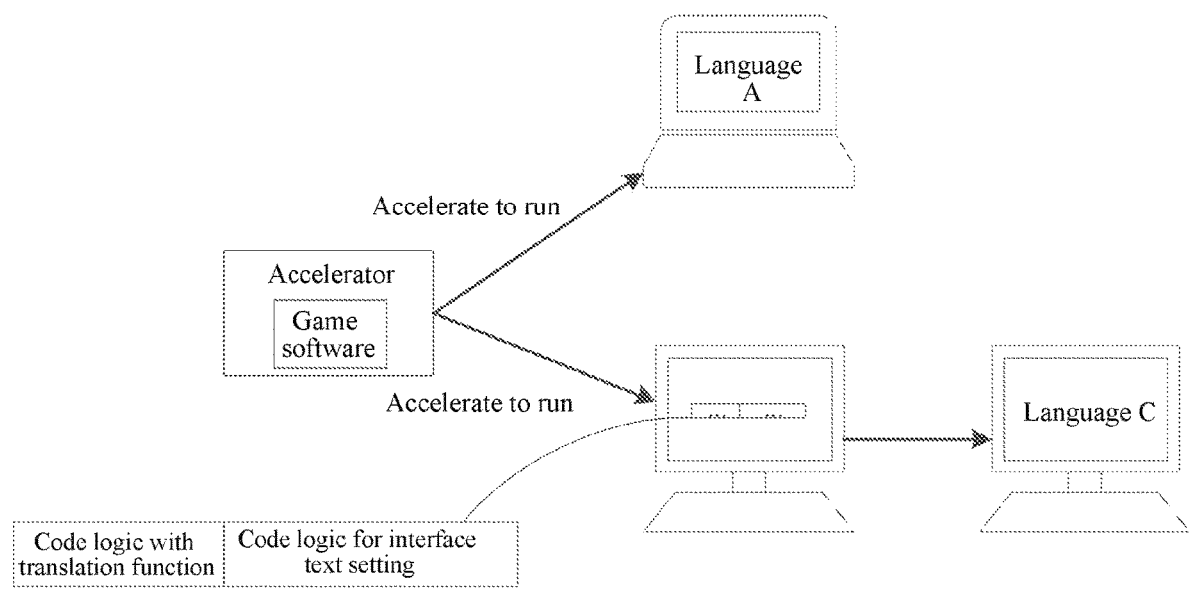
FIG. 6 is a schematic diagram of an application scenario of another method for software translation according to an embodiment of the present disclosure.

Referring to FIG. 6, it shows a schematic diagram of an another application scenario of a method for software translation according to some embodiments of the present disclosure. It is assumed that there is a certain game software and the language text of the software program is language A, and the game software (where, the computer software is installed) can be accelerated to run through an accelerator. A game software user 1 and a game software user 2 may respectively run the accelerator to accelerate to run the game software. The language environment of the game software user 1 is language A, and the language environment of the game software user 2 is language C. When the game software user 1 accelerates to run the computer software, the game software user 1 can directly accelerate to run the game software; and at this time, the interface text of the language A is displayed on the game software interface that is accelerated to run. When the game software user 2 accelerates to run the game software, in the process of accelerating to run the installed game software, in the UI language display link, the code logic for the first interface text setting used for interface text setting can be rewritten through the accelerator that is run, that is, after the interface text of the language A is translated into the language C through the code logic with the translation function set in the code logic for the first interface text setting, the translated interface text is displayed on the game interface through the code logic for the second interface text setting backed up before rewriting.

In the embodiments of the present disclosure, the text that needs to be displayed on the UI is obtained by the calling the API for rewriting the UI component text setting, the links of analysis, translation, modification, and replacement of additional language resource packages for the software are avoided, the content that needs to be displayed on the software UI interface is dynamically obtained in real time for translation, and the UI language of the software can be comprehensively translated. In addition, the manner of machine translation and manual proofreading is adopted, so that the rapidity of the translation process and the accuracy of the translation result can be ensured. Due to the fact that the rewriting operation on the UI text setting API is at the memory level, the solution has a universal usage scenario, and is not limited by the upper layer specific UI or service logic of the software itself, with on need to analyze and understand the UI or service logic of the software, and with no need to consider the verification mechanism of the software to the language resource packet.

It should be noted that, for the method embodiments, for simplicity of description, they are represented as a series of action combinations, but those skilled in the art should understand that the embodiments of the present disclosure are not limited by the described action sequence, because some steps may be performed in other sequences or simultaneously according to the embodiments of the present disclosure. Secondly, those skilled in the art should also know that the embodiments described in the description are all preferred embodiments, and the involved actions are not necessarily necessary for the embodiments of the present disclosure.

Figure 7:
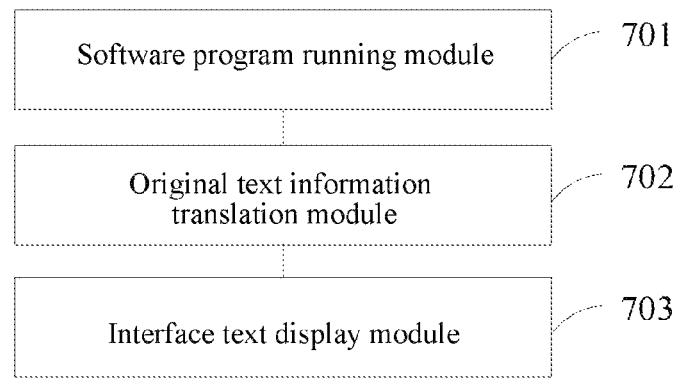
FIG. 7 is a structural block diagram of an apparatus for software translation according to an embodiment of the present disclosure.

Referring to FIG. 7, it shows a structural block diagram of an apparatus for software translation according to an embodiment of the present disclosure, which may specifically include the following modules: a software program running module 701, an original text information translation module 702 and an interface text display module 703.

The software program running module 701 is configured to perform running a target software program and determining a target file in the target software program, where the target file includes a code logic for a first interface text setting.

The original text information translation module 702 is configured to perform setting a code logic with a translation function in a code logic for a first interface text setting and translating original text information in a software interface through the code logic with the translation function to obtain target text information.

The interface text display module 703 is configured to perform displaying a corresponding software interface according to the target text information through a code logic for a second interface text setting.

In an embodiment of the present disclosure, the original text information translation module 702 may include the following sub-modules: a code logic rewriting sub-module.

The code logic rewriting sub-module is configured to perform rewriting the code logic for the first interface text setting by using the code logic with the translation function.

In an embodiment of the present disclosure, the code logic rewriting sub-module may include the following units: an interface function obtaining unit and an interface function direction unit.

The interface function obtaining unit is configured to perform obtaining an interface function in the code logic for the first interface text setting;

The interface function direction unit is configured to perform an interception operation on an interface function for the first interface text setting, and direct the interface function used for interface text setting to a rewritten code logic, where the rewritten code logic includes the code logic for the first interface text setting of the code logic with the translation function.

In an embodiment of the present disclosure, the interface text display module may include the following sub-modules: an interface text display sub-module.

The interface text display sub-module is configured to perform, after the interception operation on the interface function for the first interface text setting, calling back a interface function for the second interface text setting to display the target software interface text corresponding to the target text information.

In an embodiment of the present disclosure, the code logic rewriting sub-module may include the following units: a code logic position determination unit and a code logic rewriting unit.

The code logic position determination unit is configured to perform determining a code logic position of the code logic for the first interface text setting in a code segment in a memory.

The code logic rewriting unit is configured to perform rewriting, at the code logic position, the code logic for the first interface text setting by using the code logic with the translation function.

In an embodiment of the present disclosure, the code logic position determination unit may include the following sub-units: an interface text setting information obtaining sub-unit and a code logic position determination sub-unit.

The interface text setting information obtaining sub-unit is configured to perform obtaining interface text setting information for the target software program, where the interface text setting information includes interface function information for the first interface text setting.

The code logic position determination sub-unit is configured to perform function symbol static scanning analysis on a target file of the target software program according to the interface function information, and determine the code logic position of the code logic for the first interface text setting in the code segment in the memory.

In an embodiment of the present disclosure, the code logic rewriting unit may include the following sub-units: a code logic position determination sub-unit and a code logic rewriting sub-unit.

The code logic position determination sub-unit is configured to perform determining a code logic position that needs to be modified according to the code logic position of the first interface text setting in the code segment in the memory when running the target software program to load a preset dynamic link library.

The code logic rewriting sub-unit is configured to perform modifying the code logic for the first interface text setting at the code logic position that needs to be modified, and replacing the code logic for the first interface text setting with the code logic with the translation function.

For the embodiments of the apparatus, since the embodiments of the apparatus are basically similar to the method embodiments, the description is relatively simple, and the related parts may refer to part of the description of the method embodiments.

Embodiments of the present disclosure further provide an electronic device.

The electronic device includes a processor, a memory, and a computer program stored on the memory and capable of running on the processor, and when the computer program is run by the processor, the following method steps are implemented:

running a target software program, and determining a target file in the target software program, where the target file includes code logic for the first interface text setting;

setting a code logic with a translation function in a code logic for a first interface text setting, and translating original text information in a software interface through the code logic with the translation function to obtain target text information;

displaying a corresponding software interface according to the target text information through a code logic for a second interface text setting.

In some embodiments, setting a code logic with a translation function in a code logic for a first interface text setting includes:

rewriting the code logic for the first interface text setting by using the code logic with the translation function.

In some embodiments, rewriting the code logic for the first interface text setting by using the code logic with the translation function includes:

obtaining an interface function in the code logic for the first interface text setting;

performing an interception operation on the interface function for the first interface text setting, and directing the first interface text setting to a rewritten code logic, where the rewritten code logic includes the code logic for the first interface text setting of the code logic with the translation function.

In some embodiments, displaying a corresponding software interface according to the target text information through a code logic for a second interface text setting includes:

after the interception operation on the interface function for the first interface text setting, calling back an interface function for the second interface text setting to display a target software interface text corresponding to the target text information.

In some embodiments, rewriting the code logic for the first interface text setting by using the code logic with the translation function includes:

determining a code logic position of the code logic for the first interface text setting in a code segment in a memory;

rewriting, at the code logic position, the code logic for the first interface text setting by using the code logic with the translation function.

In some embodiments, determining a code logic position of the code logic for the first interface text setting in a code segment in a memory includes:

obtaining interface text setting information for the target software program, where the interface text setting information includes interface function information for the first interface text setting;

performing function symbol static scanning analysis on the target file of the target software program according to the interface function information, and determining the code logic position of the code logic for the first interface text setting in the code segment in the memory.

In some embodiments, translating original text information in a software interface through the code logic with the translation function to obtain target text information includes:

determining a code logic position that needs to be modified according to the code logic position of the first interface text setting in the code segment in the memory when running the target software program to load a preset dynamic link library;

replacing a code logic at the code logic position that needs to be modified with the code logic with the translation function, and backing up the code logic for the second interface text setting before replacement;

running the code logic with the translation function to translate the original text information to obtain the target text information.

The specific embodiment content of the method for software translation running in the present embodiment is also applicable to the embodiments of the foregoing method for software translation, and therefore, details are not described here.

In the embodiments of the present disclosure, the target software program may be run, the code logic with the translation function is set in the code logic for the first interface text setting of the target software program, the original text information in the software interface is translated through the code logic with the translation function, and then the corresponding software interface is displayed according to the target text information through the code logic for the second interface text setting, achieving translation and display of the software interface text when running the software program. Specifically, the API implementation for the UI component text setting is called through the program, so that internationalized translation of the computer software can be realized based on the inserted code logic with the translation function when the UI language text is displayed. The use threshold caused by the language obstacle problem is lowered, so that the use of the computer software can efficiently adapt to the language environment and habit of the computer software user, improving the use experience of the computer software user on the software.

Embodiments of the present disclosure further provide a computer-readable storage medium, a computer program is stored in the computer-readable storage medium, and when the computer program is run by a processor, the following method steps are implemented:

running a target software program, and determining a target file in the target software program, where the target file includes code logic for the first interface text setting;

setting a code logic with a translation function in a code logic for a first interface text setting, and translating original text information in a software interface through the code logic with the translation function to obtain target text information;

displaying a corresponding software interface according to the target text information through a code logic for a second interface text setting.

In some embodiments, setting a code logic with a translation function in a code logic for a first interface text setting includes:

rewriting the code logic for the first interface text setting by using the code logic with the translation function.

In some embodiments, rewriting the code logic for the first interface text setting by using the code logic with the translation function includes:

obtaining an interface function in the code logic for the first interface text setting;

performing an interception operation on the interface function for the first interface text setting, and directing the first interface text setting to a rewritten code logic, where the rewritten code logic includes the code logic for the first interface text setting of the code logic with the translation function.

In some embodiments, displaying a corresponding software interface according to the target text information through a code logic for a second interface text setting includes:

after the interception operation on the interface function for the first interface text setting, calling back an interface function for the second interface text setting to display a target software interface text corresponding to the target text information.

In some embodiments, rewriting the code logic for the first interface text setting by using the code logic with the translation function includes:

determining a code logic position of the code logic for the first interface text setting in a code segment in a memory;

rewriting, at the code logic position, the code logic for the first interface text setting by using the code logic with the translation function.

In some embodiments, determining a code logic position of the code logic for the first interface text setting in a code segment in a memory includes:

obtaining interface text setting information for the target software program, where the interface text setting information includes interface function information for the first interface text setting;

performing function symbol static scanning analysis on the target file of the target software program according to the interface function information, and determining the code logic position of the code logic for the first interface text setting in the code segment in the memory.

In some embodiments, translating original text information in a software interface through the code logic with the translation function to obtain target text information includes:

determining a code logic position that needs to be modified according to the code logic position of the first interface text setting in the code segment in the memory when running the target software program to load a preset dynamic link library;

replacing a code logic at the code logic position that needs to be modified with the code logic with the translation function, and backing up the code logic for the second interface text setting before replacement;

running the code logic with the translation function to translate the original text information to obtain the target text information.

The specific embodiment content of the method for software translation running in the present embodiment is also applicable to the embodiments of the foregoing method for software translation, and therefore, details are not described here.

In the embodiments of the present disclosure, the target software program may be run, the code logic with the translation function is set in the code logic for the first interface text setting of the target software program, the original text information in the software interface is translated through the code logic with the translation function, and then the corresponding software interface is displayed according to the target text information through the code logic for the second interface text setting, achieving translation and display of the software interface text when running the software program. Specifically, the API implementation for the UI component text setting is called through the program, so that internationalized translation of the computer software can be realized based on the inserted code logic with the translation function when the UI language text is displayed. The use threshold caused by the language obstacle problem is lowered, so that the use of the computer software can efficiently adapt to the language environment and habit of the computer software user, improving the use experience of the computer software user on the software.

Figure 8:
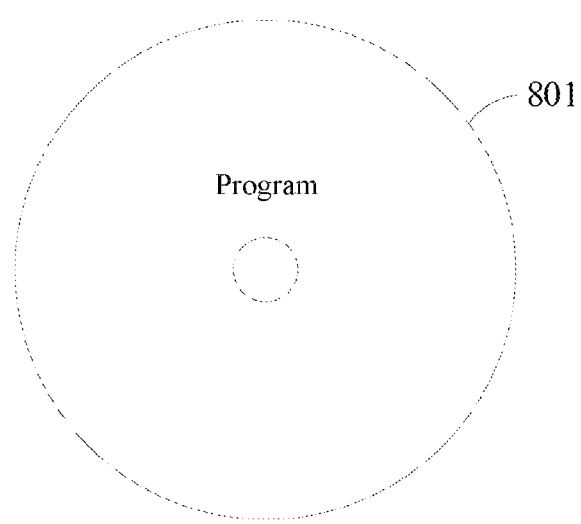
FIG. 8 is a structural block diagram of a computer-readable storage medium according to an embodiment of the present disclosure.

Referring to FIG. 8, it shows a structural block diagram of a computer-readable storage medium according to an embodiment of the present disclosure. A computer program may be stored on the computer-readable storage medium 801, where when the computer program may be executed by A processor, each process of the method for software translation embodiment may be implemented, and the same technical effect may be achieved. In order to avoid repetition, details are not described here again.

Various embodiments in the present description are described in a progressive manner, each embodiment focuses on the difference from other embodiments, and the same similar parts between the embodiments may refer to each other.

Those skilled in the art should understand that the embodiments of the present disclosure may be provided as a method, an apparatus, or a computer program product. Therefore, the embodiments of the present disclosure may take the form of an entirely hardware embodiment, an entirely software embodiment, or an embodiment combining software and hardware. Moreover, the embodiments of the present disclosure may take the form of a computer program product implemented on one or more computer-usable storage medium (including but not limited to a disk memory, a CD-ROM, an optical memory, etc.) in which a computer-usable program code is included.

Embodiments of the present disclosure are described with reference to flowcharts and/or block diagrams of methods, terminal devices (systems), and computer program products according to embodiments of the present disclosure. It should be understood that each flow and/or block in the flowcharts and/or block diagrams, and combinations of the flows and/or blocks in the flowcharts and/or block diagrams, can be implemented by computer program instructions. These computer program instructions may be provided to a processor of a general purpose computer, a special purpose computer, an embedded processor, or other programmable data processing terminal devices to generate a machine such that the instructions running through the processor of the computer or other programmable data processing terminal devices produce an apparatus for implementing the functions specified in one or more flows of the flowcharts and/or one or more blocks of the block diagrams.

These computer program instructions may also be stored in a computer-readable memory that can direct a computer or other programmable data processing terminal devices to operate in a particular manner such that the instructions stored in the computer-readable memory produce a product that includes an instruction apparatus, where the instruction apparatus implements the functions specified in one or more flows of the flowcharts and/or one or more blocks of the block diagrams.

These computer program instructions may also be loaded onto a computer or other programmable data processing terminal devices such that a series of operating steps are run on the computer or other programmable terminal devices to produce a computer-implemented process, such that instructions running on the computer or other programmable terminal devices provide steps for implementing the functions specified in one or more flows of the flowcharts and/or one or more blocks of the block diagrams.

Although the preferred embodiments of the embodiments of the present disclosure have been described, those skilled in the art may make additional changes and modifications to these embodiments once they know the basic inventive concept. Therefore, the appended claims are intended to be interpreted as including the preferred embodiments and all changes and modifications falling within the scope of the embodiments of the present disclosure.

Finally, it should also be noted that, in this context, relational terms, such as first and second, are merely used to distinguish an entity or operation from another entity or operation, without necessarily requiring or implying that there is any such actual relationship or order between these entities or operations. Moreover, the terms "comprising", "including" or any other variant of them are intended to cover a non-exclusive inclusion, such that a process, method, article, or terminal device that includes a series of elements not only includes those elements, but also includes other elements not explicitly listed, or further includes elements inherent to such a process, method, article, or terminal device. In the absence of more restrictions, the element defined by the statement "includes a . . . " does not exclude the presence of another same element in the process, method, article, or terminal device that includes the element.

The method for software translation and the apparatus for software translation provided by the present disclosure are described in detail, and specific examples are used here to describe the principles and embodiments of the present disclosure. The description of the above embodiments is merely used to help understand the method of the present disclosure and the core concept of it. Meanwhile, for those of ordinary skills in the art, according to the concept of the present disclosure, there will be changes in the specific embodiments and the application scope. In summary, the content of the present description should not be construed as a limitation to the present disclosure.

What is claimed is:

1. A method for software translation, the method comprising:
    running a target software program and determining a target file in the target software program, wherein the target file comprises a code logic for a first interface text setting;
    setting a code logic with a translation function in a code logic for a first interface text setting, and translating original text information in a software interface through the code logic with the translation function to obtain target text information, wherein rewriting for the code logic for the first interface text setting is based on rewriting, after performing an interception operation on an interface function for the first interface text setting, a direction of the interface function to the code logic for the first interface text setting having the code logic with the translation function; and
    displaying a corresponding software interface according to the target text information through a code logic for a second interface text setting.

2. The method according to claim 1, wherein setting a code logic with a translation function in a code logic for a first interface text setting comprises:
    rewriting the code logic for the first interface text setting by using the code logic with the translation function.

3. The method according to claim 2, wherein rewriting the code logic for the first interface text setting by using the code logic with the translation function comprises:
    obtaining an interface function in the code logic for the first interface text setting; and
    performing the interception operation on the interface function for the first interface text setting, and directing the interface function for the first interface text setting to a rewritten code logic, wherein the rewritten code logic comprises the code logic for the first interface text setting of the code logic with the translation function.

4. The method according to claim 3, wherein displaying a corresponding software interface according to the target text information through a code logic for a second interface text setting comprises:

after the interception operation on the interface function for the first interface text setting, calling back an interface function for the second interface text setting to display a target software interface text corresponding to the target text information.

5. The method according to claim 2, wherein rewriting the code logic for the first interface text setting by using the code logic with the translation function comprises:

determining a code logic position of the code logic for the first interface text setting in a code segment in a memory; and rewriting, at the code logic position, the code logic for the first interface text setting by using the code logic with the translation function.

6. The method according to claim 5, wherein determining a code logic position of the code logic for the first interface text setting in a code segment in a memory comprises:

obtaining interface text setting information for the target software program, wherein the interface text setting information comprises interface function information for the first interface text setting; and performing function symbol static scanning analysis on the target file of the target software program according to the interface function information, and determining the code logic position of the code logic for the first interface text setting in the code segment in the memory.

7. The method according to claim 6, wherein, rewriting, at the code logic position, the code logic for the first interface text setting by using the code logic with the translation function comprises:

determining a code logic position that needs to be modified according to the code logic position of the first interface text setting in the code segment in the memory when running the target software program to load a preset dynamic link library; and modifying the code logic for the first interface text setting at the code logic position that needs to be modified, and replacing the code logic for the first interface text setting with the code logic with the translation function.

8. The method according to claim 6, wherein, the interface function information comprises related content information about a text setting API in a UI text control.

9. The method according to claim 2, wherein, rewriting the code logic for the first interface text setting by using the code logic with the translation function comprises:

inserting the code logic with the translation function at beginning of an API logic part of a UI component text setting.

10. The method according to claim 1, wherein, the code logic for the first interface text setting is a code logic used for interface text setting in the target software program.

11. The method according to claim 1, wherein, the code logic for the second interface text setting is original code logic that is backed up, and the software interface is displayed based on calling back an interface function for the second interface text setting.

12. The method according to claim 1, wherein, translating original text information in a software interface through the code logic with the translation function is performed in a UI language display link.

13. The method according to claim 12, wherein, the original text information comprises character strings in different languages in a text form.

14. An electronic device, comprising: a processor, a memory, and a computer program stored on the memory and capable of running on the processor, wherein when the computer program is run by the processor, the electronic device is caused to:

run a target software program and determining a target file in the target software program, wherein the target file comprises a code logic for a first interface text setting;

set a code logic with a translation function in a code logic for a first interface text setting, and translate original text information in a software interface through the code logic with the translation function to obtain target text information, wherein, rewriting for the code logic for the first interface text setting is based on rewriting, after performing an interception operation on an interface function for the first interface text setting, a direction of the interface function to the code logic for the first interface text setting having the code logic with the translation function; and display a corresponding software interface according to the target text information through a code logic for a second interface text setting.

15. The electronic device according to claim 14, wherein the electronic device is further caused to:

rewrite the code logic for the first interface text setting by using the code logic with the translation function.

16. The electronic device according to claim 15, wherein the electronic device is further caused to:

obtain an interface function in the code logic for the first interface text setting; and perform the interception operation on the interface function for the first interface text setting, and direct the interface function for the first interface text setting to a rewritten code logic, wherein the rewritten code logic comprises the code logic for the first interface text setting of the code logic with the translation function.

17. The electronic device according to claim 16, wherein the electronic device is further caused to:

after the interception operation on the interface function for the first interface text setting, call back an interface function for the second interface text setting to display a target software interface text corresponding to the target text information.

18. The electronic device according to claim 15, wherein the electronic device is further caused to:

determine a code logic position of the code logic for the first interface text setting in a code segment in a memory; and rewrite, at the code logic position, the code logic for the first interface text setting by using the code logic with the translation function.

19. A non-transitory computer-readable storage medium, wherein a computer program is stored on the computer-readable storage medium, and when the computer program is run by a processor, steps a method for software translation are implemented, the method comprising:

running a target software program and determining a target file in the target software program, wherein the target file comprises a code logic for a first interface text setting;

setting a code logic with a translation function in a code logic for a first interface text setting, and translating original text information in a software interface through the code logic with the translation function to obtain target text information, wherein, rewriting for the code logic for the first interface text setting is based on rewriting, after performing an interception operation on an interface function for the first interface text setting, a direction of the interface function to the code logic for the first interface text setting having the code logic with the translation function; and displaying a corresponding software interface according to the target text information through a code logic for a second interface text setting.

\* \* \* \* \*